(12) United States Patent
Weisz et al.

(10) Patent No.: US 12,154,549 B2
(45) Date of Patent: Nov. 26, 2024

(54) LATTICE SPEECH CORRECTIONS

(71) Applicant: Google LLC, Mountain View, CA (US)

(72) Inventors: Ágoston Weisz, Mountain View, CA (US); Leonid Velikovich, New York, NY (US)

(73) Assignee: Google LLC, Mountain View, CA (US)

( * ) Notice: Subject to any disclaimer, the term of this patent is extended or adjusted under 35 U.S.C. 154(b) by 366 days.

(21) Appl. No.: 17/644,416

(22) Filed: Dec. 15, 2021

(65) Prior Publication Data
US 2023/0186898 A1    Jun. 15, 2023

Related U.S. Application Data

(60) Provisional application No. 63/265,366, filed on Dec. 14, 2021.

(51) Int. Cl.
*G10L 15/08*    (2006.01)
*G10L 15/06*    (2013.01)
(Continued)

(52) U.S. Cl.
CPC ............ *G10L 15/063* (2013.01); *G10L 15/22* (2013.01); *G10L 15/26* (2013.01); *G10L 15/30* (2013.01)

(58) Field of Classification Search
CPC ....... G10L 15/063; G10L 15/22; G10L 15/26; G10L 15/30; G10L 15/08; G10L 15/183
(Continued)

(56) References Cited

U.S. PATENT DOCUMENTS 9,953,637 B1 *   4/2018   Di Fabbrizio .......... G10L 15/22
11,521,597 B2 *  12/2022  Sharifi ..................... G06F 3/16
(Continued)

FOREIGN PATENT DOCUMENTS

JP    2018004976 A    1/2018
WO    2022010471 A1   1/2022

OTHER PUBLICATIONS

Aug. 29, 2022 Written Opinion (WO) of the International Searching Authority (ISA) and International Search Report (ISR) issued in International Application No. PCT/US2021/063508.

*Primary Examiner* — Pierre Louis Desir
*Assistant Examiner* — Fouzia Hye Solaiman
(74) *Attorney, Agent, or Firm* — Honigman LLP; Brett A. Krueger; Grant Griffith

(57) ABSTRACT

A method includes receiving audio data corresponding to a query spoken and processing the audio data to generate multiple candidate hypotheses each represented by a respective sequence of hypothesized terms. For each candidate hypothesis, the method includes determining whether the sequence of hypothesized terms includes a source phrase from a list of phrase correction pairs. Each phrase correction pair includes a corresponding source phrase that was misrecognized and a corresponding target phrase replacing the source phrase. When the respective sequence of hypothesized terms includes the source phrase, the method includes generating a corresponding additional candidate hypothesis that replaces the source phrase. The method also includes ranking the multiple candidate hypotheses and each corresponding additional candidate hypothesis generated and generating a transcription of the query spoken by the user by selecting the highest ranking one of the multiple candidate hypotheses and each additional candidate hypothesis.

18 Claims, 8 Drawing Sheets

(51) Int. Cl.
  *G10L 15/183*  (2013.01)
  *G10L 15/22*   (2006.01)
  *G10L 15/26*   (2006.01)
  *G10L 15/30*   (2013.01)

(58) Field of Classification Search
  USPC .......................................................... 704/257
  See application file for complete search history.

(56) References Cited

U.S. PATENT DOCUMENTS

| | | | |
|---|---|---|---|
| 11,810,568 B2 * | 11/2023 | Aleksic | G10L 15/07 |
| 2012/0303371 A1 * | 11/2012 | Labsky | G10L 15/14 |
| | | | 704/E13.011 |
| 2016/0365092 A1 * | 12/2016 | Moreno Mengibar | |
| | | | G10L 15/197 |
| 2017/0270928 A1 | 9/2017 | Skobeltsyn et al. | |
| 2018/0012594 A1 * | 1/2018 | Behzadi | G10L 15/1815 |
| 2020/0243070 A1 | 7/2020 | Kapralova et al. | |
| 2021/0090569 A1 | 3/2021 | Aleksic et al. | |
| 2022/0310067 A1 * | 9/2022 | Huang | G06F 40/30 |
| 2022/0310080 A1 * | 9/2022 | Qiu | G10L 15/063 |

* cited by examiner

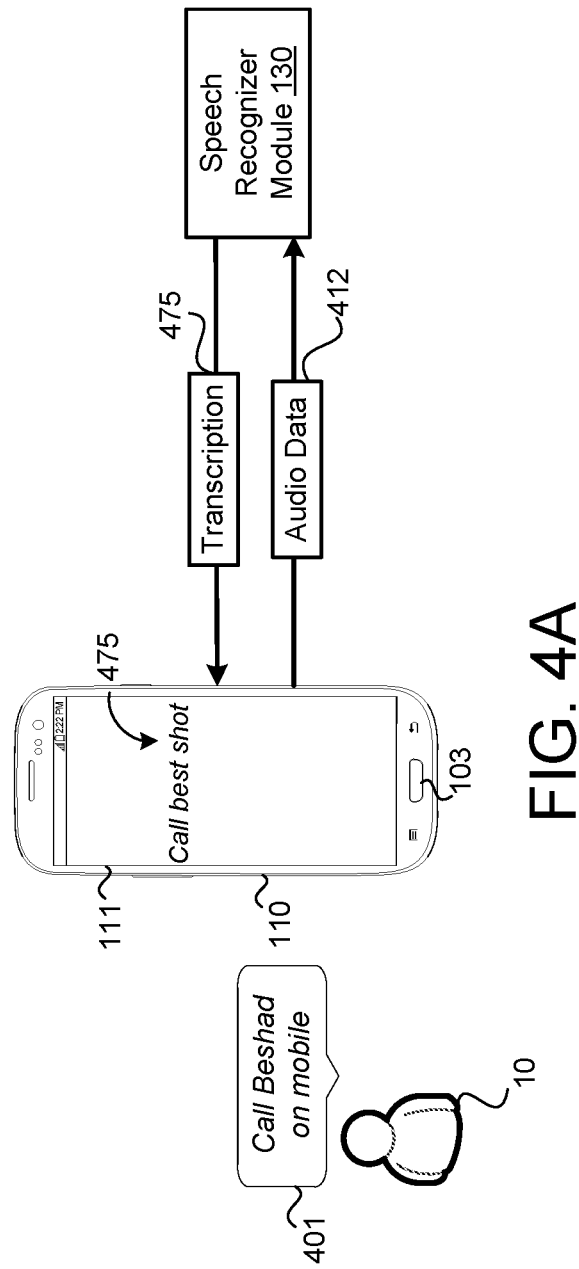

LATTICE SPEECH CORRECTIONS

CROSS REFERENCE TO RELATED APPLICATIONS

This U.S. patent application claims priority under 35 U.S.C. § 119(e) to U.S. Provisional Application 63/265,366, filed on Dec. 14, 2021. The disclosure of this prior application is considered part of the disclosure of this application and is hereby incorporated by reference in its entirety.

TECHNICAL FIELD

This disclosure relates to lattice speech corrections

BACKGROUND

Automatic speech recognition (ASR) systems provide a technology that is typically used in mobile devices and other devices. In general, ASR systems attempt to provide accurate transcriptions of what a user speaks to the mobile device. In some instances, ASR systems generate inaccurate transcriptions that do not match what the user spoke. In these instances, the user may correct the inaccurate transcription by providing a user input that corrects the transcription at the mobile device. One challenge of ASR systems includes how to best utilize the user input that corrects the inaccurate transcription to generate accurate transcriptions in the future.

SUMMARY

One aspect of the disclosure provides a computer-implemented that when executed on data processing hardware causes the data processing hardware to perform operations that include receiving audio data corresponding to a query spoken by a user and processing, using a speech recognizer, the audio data to generate multiple candidate hypotheses. Each candidate hypothesis corresponds to a candidate transcription for the query and is represented by a respective sequence of hypothesized terms. For each candidate hypothesis, the method also includes determining whether the respective sequence of hypothesized terms includes a source phrase from a list of phrase correction pairs, and when the respective sequence of hypothesized terms includes the source phrase, generating a corresponding additional candidate hypothesis that replaces the source phrase in the respective sequence of hypothesized terms with a corresponding target phrase. Each phrase correction pair in the list of phrase correction pairs includes a corresponding source phrase that was misrecognized in a corresponding previous transcription transcribed by the speech recognizer for a previous utterance spoken by the user and a corresponding target phrase that corresponds to a user correction replacing the source phrase misrecognized in the corresponding previous transcription transcribed by the speech recognizer. The method also includes ranking the multiple candidate hypotheses and each corresponding additional candidate hypothesis generated and generating a transcription of the query spoken by the user by selecting the highest ranking one of the multiple candidate hypotheses and each corresponding additional candidate hypothesis generated.

Implementations of the disclosure may include one or more of the following optional features. In some implementations, the operations further include, for each phrase correction pair in the list of phrase correction pairs: identifying n-grams in a language model that include the corresponding source phrase; cloning corresponding new n-grams that substitute the corresponding target phrase for the corresponding source phrase in the identified n-grams; modifying the language model; and determining a corresponding prior likelihood score for each additional candidate hypothesis using the modified language model configured to receive each additional candidate hypothesis as input. Here, modifying the language model includes: adding, to the language model, the new n-grams that substitute the corresponding target phrase for the source phrase; and conditioning the language model to determine a higher prior likelihood score for a unigram of the target phrase than for a unigram of the source phrase. In these implementations, ranking the multiple candidate hypotheses and each additional candidate hypothesis is based on the corresponding prior likelihood score determined for each additional candidate hypothesis.

In additional implementations, the operations further include, for each phrase correction pair in the list of phrase correction pairs: obtaining an original sequence of n-grams representing the corresponding previous transcription that misrecognized the corresponding source phrase; obtaining a corrected sequence of n-grams that replaces the source phrase in the original sequence of n-grams with the corresponding target phrase, modifying the language model; and determining, using the modified language model configured to receive each additional candidate hypothesis as input, a corresponding prior likelihood score for each additional candidate hypothesis. The original sequence of n-grams includes the corresponding source phrase and one or more other terms that precede and/or are subsequent to the corresponding source phrase in the corresponding previous transcription and the corrected sequence of n-grams includes the target phrase and the same one or more other terms that precede and/or are subsequent to the corresponding source phrase in the corresponding previous transcription. Here, modifying the language model includes: adding the original sequence of n-grams and the corrected sequence of n-grams to the language model and conditioning the language model to determine a higher prior likelihood score for a number of n-grams from the corrected sequence of n-grams that includes the target phrase than for a same number of n-grams from the original sequence of n-grams that includes the source phrase. In these implementations, ranking the multiple candidate hypotheses and each additional candidate hypothesis is based on the corresponding prior likelihood score determined for each additional candidate hypothesis. Optionally, the original and corrected sequences of n-grams may each further includes n-grams representing sentence boundaries of the corresponding previous transcription transcribed by the speech recognizer for the previous utterance spoken by the user.

In the preceding implementations, a margin between the prior likelihood scores determined by the language model for the number of n-grams from the corrected sequence of n-grams and the same number of n-grams from the original sequence of n-grams may increase as the number of n-grams from the corrected and original sequences of n-grams increases. Additionally or alternatively, conditioning the language model may further include conditioning the language model to determine a lower prior likelihood score for a first number of n-grams from the sequence of n-grams that includes the target phrase than for a greater second number of n-grams from the sequence of n-grams that includes the target phrase.

In some examples, the operations further include obtaining a corresponding likelihood score that the speech recognizer assigned to the corresponding candidate hypothesis for each of the multiple candidate hypotheses generated by the speech recognizer, and after generating each additional candidate hypothesis, determining, using an additional hypothesis scorer, a corresponding likelihood score for each additional candidate hypothesis generated. Here, ranking the multiple candidate hypotheses and each corresponding additional candidate hypothesis generated is based on the corresponding likelihood scores assigned to the multiple candidate hypothesis by the speech recognizer and the corresponding likelihood score determined for each additional candidate hypothesis using the additional hypothesis scorer. In these examples, the additional hypothesis scorer includes at least one of: an acoustic model configured to process audio data to determine an acoustic modeling score for a portion of the audio data that includes either the source phrase or the target phrase; or a language model configured to receive each additional candidate hypothesis as input and determine a corresponding prior likelihood score for each additional candidate hypothesis. Here, the corresponding likelihood score determined for each additional candidate hypothesis may be based on at least one of the acoustic modeling score or the corresponding prior likelihood score determined for the additional candidate hypothesis.

The language model may include an auxiliary language model external to the speech recognizer or an internal language model integrated with the speech recognizer. Additionally, the speech recognizer may include an end-to-end speech recognition model configured to generate the corresponding likelihood score for each of the multiple candidate hypotheses. Alternatively, the speech recognizer may include an acoustic model and a language model, wherein the corresponding likelihood score that the speech recognizer assigned to each of the multiple candidate hypotheses may be based on at least one of an acoustic modeling score output by the acoustic model or a corresponding prior likelihood score output by the language model.

Another aspect of the disclosure provides a system that includes data processing hardware and memory hardware in communication with the data processing hardware. The memory hardware stores instructions that when executed on the data processing hardware causes the date processing hardware to perform operations that include that include receiving audio data corresponding to a query spoken by a user and processing, using a speech recognizer, the audio data to generate multiple candidate hypotheses. Each candidate hypothesis corresponds to a candidate transcription for the query and is represented by a respective sequence of hypothesized terms. For each candidate hypothesis, the method also includes determining whether the respective sequence of hypothesized terms includes a source phrase from a list of phrase correction pairs, and when the respective sequence of hypothesized terms includes the source phrase, generating a corresponding additional candidate hypothesis that replaces the source phrase in the respective sequence of hypothesized terms with a corresponding target phrase. Each phrase correction pair in the list of phrase correction pairs includes a corresponding source phrase that was misrecognized in a corresponding previous transcription transcribed by the speech recognizer for a previous utterance spoken by the user and a corresponding target phrase that corresponds to a user correction replacing the source phrase misrecognized in the corresponding previous transcription transcribed by the speech recognizer. The method also includes ranking the multiple candidate hypotheses and each corresponding additional candidate hypothesis generated and generating a transcription of the query spoken by the user by selecting the highest ranking one of the multiple candidate hypotheses and each corresponding additional candidate hypothesis generated.

This aspect may include one or more of the following optional features. In some implementations, the operations further include, for each phrase correction pair in the list of phrase correction pairs: identifying n-grams in a language model that include the corresponding source phrase; cloning corresponding new n-grams that substitute the corresponding target phrase for the corresponding source phrase in the identified n-grams; modifying the language model; and determining a corresponding prior likelihood score for each additional candidate hypothesis using the modified language model configured to receive each additional candidate hypothesis as input. Here, modifying the language model includes: adding, to the language model, the new n-grams that substitute the corresponding target phrase for the source phrase; and conditioning the language model to determine a higher prior likelihood score for a unigram of the target phrase than for a unigram of the source phrase. In these implementations, ranking the multiple candidate hypotheses and each additional candidate hypothesis is based on the corresponding prior likelihood score determined for each additional candidate hypothesis.

In additional implementations, the operations further include, for each phrase correction pair in the list of phrase correction pairs: obtaining an original sequence of n-grams representing the corresponding previous transcription that misrecognized the corresponding source phrase; obtaining a corrected sequence of n-grams that replaces the source phrase in the original sequence of n-grams with the corresponding target phrase, modifying the language model; and determining, using the modified language model configured to receive each additional candidate hypothesis as input, a corresponding prior likelihood score for each additional candidate hypothesis. The original sequence of n-grams includes the corresponding source phrase and one or more other terms that precede and/or are subsequent to the corresponding source phrase in the corresponding previous transcription and the corrected sequence of n-grams includes the target phrase and the same one or more other terms that precede and/or are subsequent to the corresponding source phrase in the corresponding previous transcription. Here, modifying the language model includes: adding the original sequence of n-grams and the corrected sequence of n-grams to the language model and conditioning the language model to determine a higher prior likelihood score for a number of n-grams from the corrected sequence of n-grams that includes the target phrase than for a same number of n-grams from the original sequence of n-grams that includes the source phrase. In these implementations, ranking the multiple candidate hypotheses and each additional candidate hypothesis is based on the corresponding prior likelihood score determined for each additional candidate hypothesis. Optionally, the original and corrected sequences of n-grams may each further includes n-grams representing sentence boundaries of the corresponding previous transcription transcribed by the speech recognizer for the previous utterance spoken by the user.

In the preceding implementations, a margin between the prior likelihood scores determined by the language model for the number of n-grams from the corrected sequence of n-grams and the same number of n-grams from the original sequence of n-grams may increase as the number of n-grams from the corrected and original sequences of n-grams increases. Additionally or alternatively, conditioning the language model may further include conditioning the language model to determine a lower prior likelihood score for a first number of n-grams from the sequence of n-grams that includes the target phrase than for a greater second number of n-grams from the sequence of n-grams that includes the target phrase.

In some examples, the operations further include obtaining a corresponding likelihood score that the speech recognizer assigned to the corresponding candidate hypothesis for each of the multiple candidate hypotheses generated by the speech recognizer, and after generating each additional candidate hypothesis, determining, using an additional hypothesis scorer, a corresponding likelihood score for each additional candidate hypothesis generated. Here, ranking the multiple candidate hypotheses and each corresponding additional candidate hypothesis generated is based on the corresponding likelihood scores assigned to the multiple candidate hypothesis by the speech recognizer and the corresponding likelihood score determined for each additional candidate hypothesis using the additional hypothesis scorer. In these examples, the additional hypothesis scorer includes at least one of: an acoustic model configured to process audio data to determine an acoustic modeling score for a portion of the audio data that includes either the source phrase or the target phrase; or a language model configured to receive each additional candidate hypothesis as input and determine a corresponding prior likelihood score for each additional candidate hypothesis. Here, the corresponding likelihood score determined for each additional candidate hypothesis may be based on at least one of the acoustic modeling score or the corresponding prior likelihood score determined for the additional candidate hypothesis.

The language model may include an auxiliary language model external to the speech recognizer or an internal language model integrated with the speech recognizer. Additionally, the speech recognizer may include an end-to-end speech recognition model configured to generate the corresponding likelihood score for each of the multiple candidate hypotheses. Alternatively, the speech recognizer may include an acoustic model and a language model, wherein the corresponding likelihood score that the speech recognizer assigned to each of the multiple candidate hypotheses may be based on at least one of an acoustic modeling score output by the acoustic model or a corresponding prior likelihood score output by the language model.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A-4C are schematic views of a user providing an input indication to correct a misrecognized previous transcription.

Like reference symbols in the various drawings indicate like elements.

DETAILED DESCRIPTION

Automatic speech recognition (ASR) systems are becoming increasingly popular in client devices as the ASR systems continue to provide more accurate transcriptions of what users speak. Still, in some instances, ASR systems generate inaccurate transcriptions that misrecognize what the user actually spoke. This is often the case when words are acoustically similar or when the user speaks a unique word unknown to the ASR system. For example, "I say" and "Ice age" sound very much alike and it may be difficult for ASR systems to disambiguate which phrase the user intended to convey. In some examples, if the client device incorrectly transcribes "I say" when the user actually intended to convey "Ice age," the user may correct the transcription by using the client device (e.g., inputting the correct transcription via a keyboard of the client device).

One particular difficulty of ASR systems is how to leverage these user corrections to generate more accurate transcriptions for the user for subsequent utterances. For example, the ASR system cannot simply transcribe "Ice age" every time an utterance spoken by the user sounds similar to "I say" and "Ice age." That is, just because the user intended to convey "Ice age" previously does not mean the user will never intend to convey "I say" at a later time. Moreover, if the user continues to convey "Ice age" but the ASR system repeatedly generates the incorrect transcription "I say," the user may lose trust in the ASR system.

Implementations herein are directed to systems and methods of performing lattice speech corrections. In particular, a computing system receives audio data for an utterance spoken by a user and the computing system processes the audio data to generate a candidate hypothesis. The computing system then determines whether any words or phrases in the candidate hypothesis include a source phrase (e.g., a previously misrecognized phrase) transcribed by the computing system. When the computing system determines the candidate hypothesis includes the source phrase, the computing system generates an additional candidate hypothesis that replaces the source phrase with a corrected phrase (e.g., target phrase). Thereafter, the computing system generates likelihood scores for each of the candidate hypothesis and the additional candidate hypothesis. Here, the likelihood scores indicate a probability that the hypothesis is a correct transcription of the utterance spoken by the user. The computing system generates a transcription of the utterance spoken by the user by selecting the highest likelihood score of either the candidate hypothesis or the additional candidate hypothesis.

Figure 1:
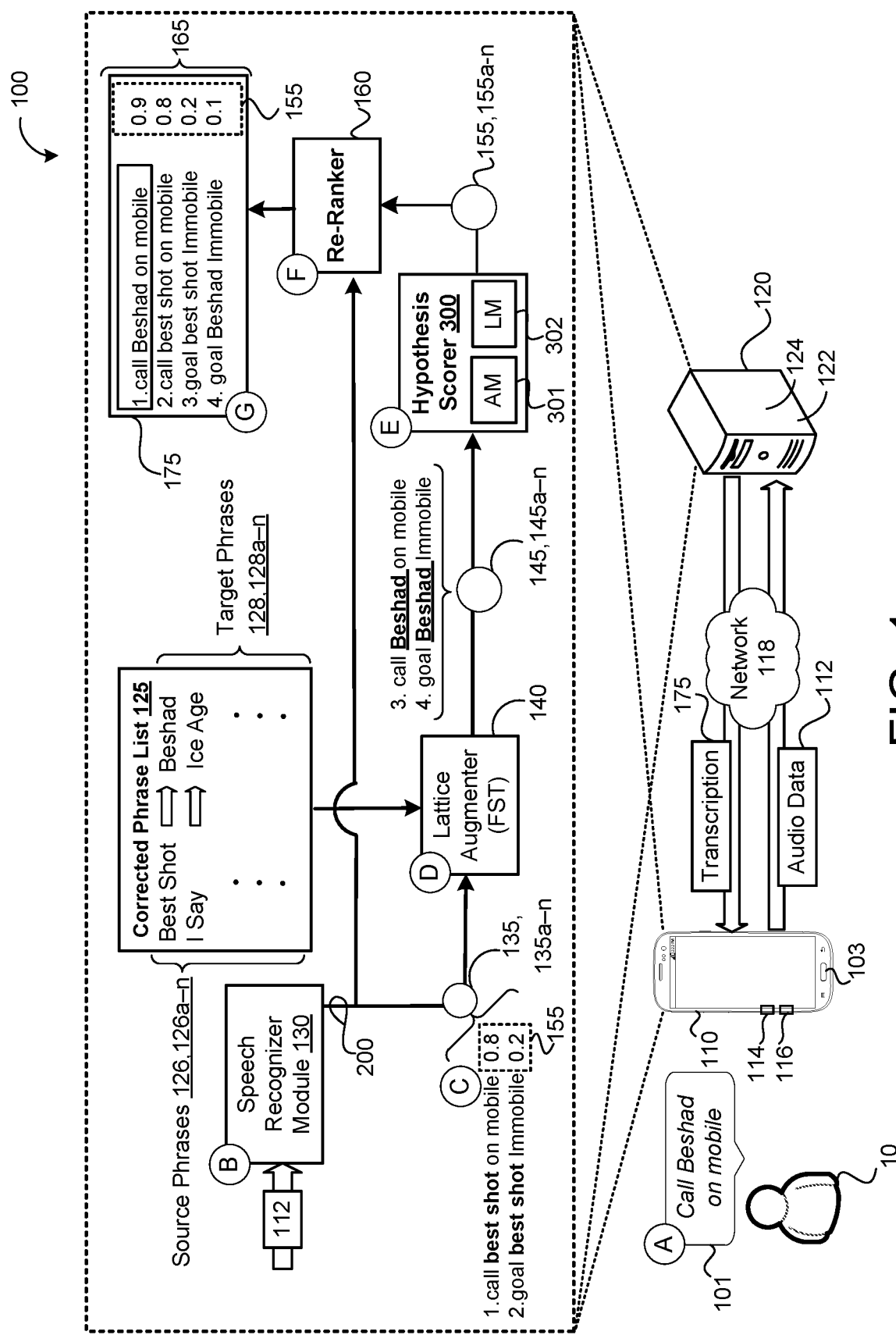
FIG. 1 is a schematic view of an example system for automatic speech recognition using phrase correction pairs.

FIG. 1 illustrates an example of a system 100 for automatic speech recognition (ASR) of an utterance 101 spoken by a user 10 using audio data 112 corresponding to the utterance (i.e., query) 101. The system 100 includes a client device 110, a computing system 120, and a network 118. The computing system 120 may be a distributed system (e.g., cloud computing environment) having scalable elastic resources. The resources include computing resources 122 (e.g., data processing hardware) and/or storage resources 124 (e.g., memory hardware). The network 118 can be wired, wireless, or a combination thereof, and may include private networks and/or public networks, such as the internet.

In some examples, the computing system 120 receives audio data 112 from the client device 110, and the computing system 120 processes the audio data 112 to generate multiple candidate hypotheses 135 for the utterance 101 based on the audio data 112. Here, each candidate hypothesis corresponds to a candidate transcription for the utterance 101 and is represented by a respective sequence of hypothesized terms. As described in greater detail below, for each candidate hypotheses 135, the computing system 120 is configured to determine whether the respective sequence of hypothesized terms includes a source phrase 126 from a corrected phrase list 125. When the respective sequence of hypothesized terms includes a source phrase 126 from the corrected phrase list 125, the computing system 120 is configured to generate an additional candidate hypothesis 145 that replaces the source phrase 126 with a corresponding target phrase 128. Thereafter, the computing system 120 generates a transcription 175 by selecting a highest ranking hypothesis from the multiple candidate hypotheses 135 or the additional candidate hypotheses 145.

FIG. 1 shows operations (A) to (G) which illustrate a flow of data. As described herein, the computing system 120 performs operations (B) to (G). However, it is understood that the client device 110 may also perform operations (B) to (G) in addition to, or in lieu of, the computing system 120 performing the operations. In some examples, the client device 110 performs a first portion of the operations (e.g., operations (B) to (D)) and the computing system 120 performs a second portion of the operations (e.g., operations (E) to (G)), or vice-versa.

The client device 110 includes data processing hardware 114 and memory hardware 116. The client device 110 may include one or more audio capture devices (e.g., microphone (s)) 103 for capturing and converting utterances 101 from the user10 into the audio data 112 (e.g., electrical signals). In some examples, the microphone 103 is separate from the client device 110 and in communication with the client device 110 to provide the recorded utterance 101 to the client device 110. The client device 110 can be any computing device capable of communicating with the computing system 120 through the network 118. The client device 110 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches).

In the example of FIG. 1, during stage (A), the user 10 speaks an utterance 101, and the microphone 103 of the client device 110 records the utterance 101. In this example, the utterance 101 includes the user 10 speaking "call Beshad on mobile." The client device 110 transmits the audio data 112, corresponding to the utterance 101 recorded by the microphone 103, to the computing system 120 via the network 118. During stage (B), the computing system 120 processes the audio data 112 to generate multiple candidate hypotheses 135, 135a-n. Here, each candidate hypothesis 135 corresponds to a candidate transcription for the utterance 101 and is represented by a respective sequence of hypothesized terms. For example, the computing system 120 may execute the speech recognizer module 130 (e.g., an automated speech recognition (ASR) module) for producing a word lattice 200 indicating the multiple candidate hypotheses transcriptions 135 that may be possible for the utterance 101 based on the audio data 112. The speech recognizer module 130 may evaluate potential paths through the word lattice 200 to determine the multiple candidate hypotheses 135.

Figure 2A:
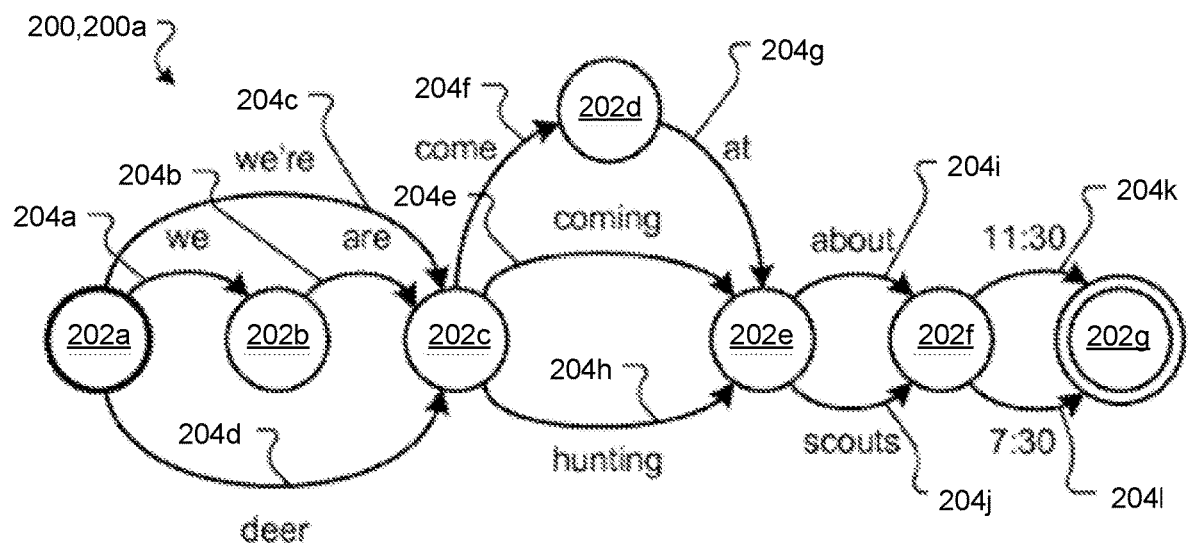
FIGS. 2A and 2B are schematic views of diagrams that illustrate examples of word lattices.

FIG. 2A is illustrates an example of a word lattice 200, 200a that may be provided by the speech recognizer module 130 of FIG. 1. The word lattice 200a represents multiple possible combinations of words that may form different candidate hypotheses 135 for an utterance 101.

The word lattice 200a includes one or more nodes 202a-g that correspond to the possible boundaries between words. The word lattice 200a includes multiple edges 204a-l for the possible words in the candidate hypotheses that result from the word lattice 200a. In addition, each of the edges 204a-l can have one or more weights or probabilities of that edge being the correct edge from the corresponding node. The weights are determined by the speech recognizer module 130 and can be based on, for example, a confidence in the match between the speech data and the word for that edge and how well the word fits grammatically and/or lexically with other words in the word lattice 200a.

For example, initially, the most probable path (e.g., most probable candidate hypothesis 135) through the word lattice 200a may include the edges 204c, 204e, 204i, 204k, which have the text "we're coming about 11:30." A second best path (e.g., second best candidate hypothesis 135) through the word lattice 200a may include the edges 204d, 204h, 204j, 204l, which have the text "deer hunting scouts 7:30."

Each pair of nodes may have one or more paths corresponding to the alternate words in the various candidate hypotheses 135. For example, the initial most probable path between the node pair beginning at node 202a and ending at the node 202c is the edge 204c "we're." This path has alternate paths that include the edges 204a, 204b "we are" and the edge 204d "deer."

Figure 2B:
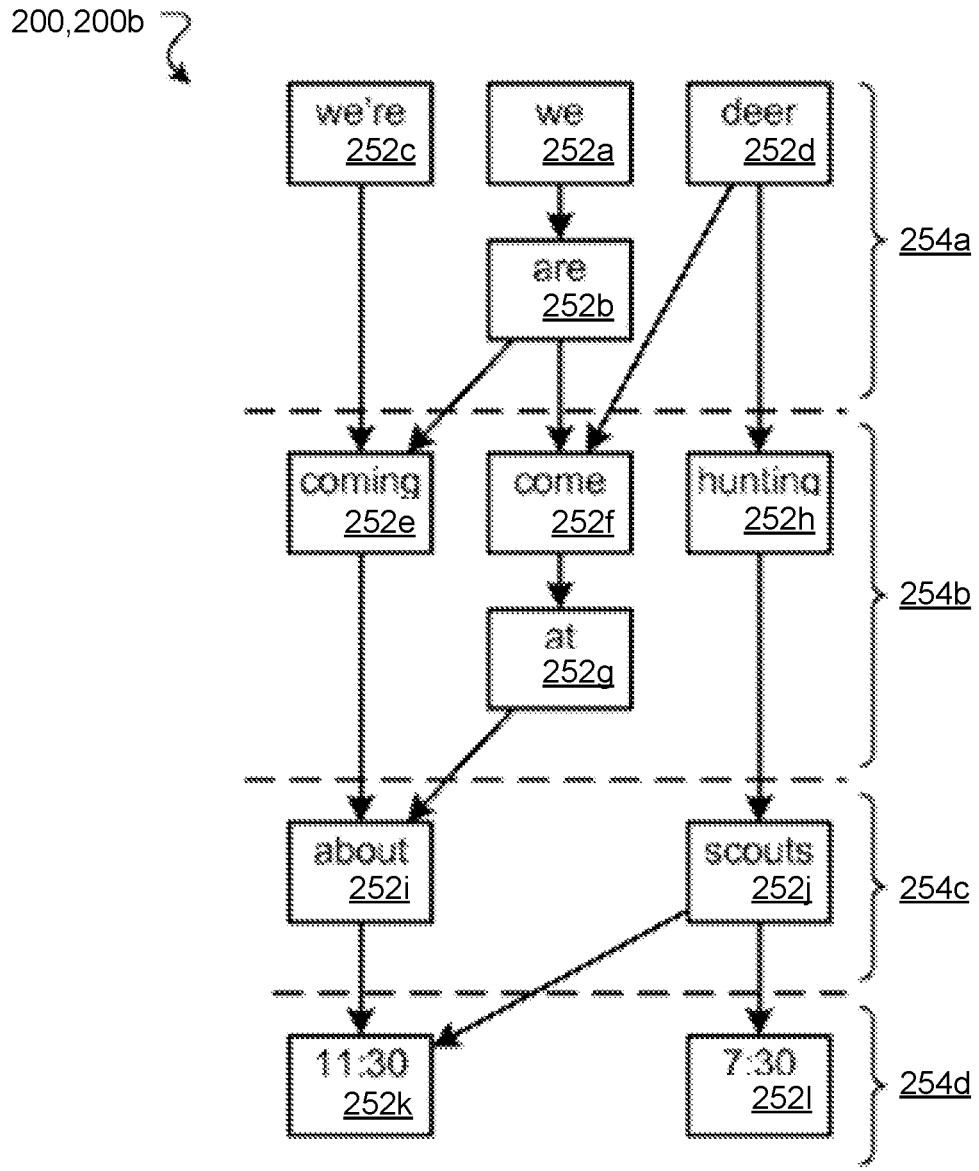

FIG. 2B is an example of a hierarchical word lattice 200, 200b that may be provided by the speech recognizer module 130 of FIG. 1. The word lattice 200b includes nodes 252a-l that represent words that make up the various candidate hypotheses 135 for an utterance 101. The edges between the nodes 252a-l show that the possible candidate hypotheses 135 include: (1) the nodes 252c, 252e, 252i, 252k "we're coming about 11:30"; (2) the nodes 252a, 252b, 252e, 252i, 252k "we are coming about 11:30"; (3) the nodes 252a, 252b, 252f, 252g, 252i, 252k "we are come at about 11:30"; (4) the nodes 252d, 252f, 252g, 252i, 252k "deer come at about 11:30"; (5) the nodes 252d, 252h, 252j, 252k "deer hunting scouts 11:30"; and (6) the nodes 252d, 252h, 252j, 252l "deer hunting scouts 7:30."

Again, the edges between the nodes 242a-l may have associated weights or probabilities based on the confidence in the speech recognition (e.g., candidate hypothesis) and the grammatical/lexical analysis of the resulting text. In this example, "we're coming about 11:30" may currently be the best hypothesis and "deer hunting scouts 7:30" may be the next best hypothesis. One or more divisions, 354a-d, can be made in the word lattice 200b that group a word and its alternates together. For example, the division 254a includes the word "we're" and the alternates "we are" and "deer." The division 252b includes the word "coming" and the alternates "come at" and "hunting." The division 254c includes the word "about" and the alternate "scouts" and the division 254d includes the word "11:30" and the alternate "7:30."

Referring back to FIG. 1, the speech recognizer module 130 may generate the multiple candidate hypotheses 135 from the word lattice 200. That is, the speech recognizer module 130 generates likelihood scores 155 for each of the candidate hypotheses 135 of the word lattice 200. Each likelihood score 155 indicates a probability that the candidate hypotheses 135 is correct (e.g., matches the utterance 101). In some implementations, the speech recognizer module 130 includes an end-to-end (E2E) speech recognition model configured to receive audio data 112 and generate the word lattice 200. In particular, the E2E speech recognition model processes the audio data 112 to generate corresponding likelihood scores 155 for each of the multiple candidate hypotheses 135 from the word lattice 200. In some examples, the speech recognizer module 130 includes a separate acoustic model, language model, and/or pronunciation model. The speech recognizer module 130 may share an acoustic model and a language model with an additional hypothesis scorer 300 (e.g., acoustic model 301 and language model 302) or have an independent acoustic model and language model.

In some examples, the speech recognizer module 130 includes the acoustic model and/or the language model to generate the word lattice 200 or otherwise generate the multiple candidate hypotheses 135 for the utterance 101 based on the audio data 112. Here, the likelihood scores 155 of the multiple candidate hypotheses 135 may include a combination of an acoustic modeling score from the acoustic model and/or a prior likelihood score from the language model. Put another way, the likelihood scores 155 includes at least one of the acoustic modeling score output by the acoustic model and/or the prior likelihood score output by the language model.

During stage (C), the computing system 120 identifies a set of highest-ranking candidate hypotheses 135 from multiple candidate hypotheses 135 in the word lattice 200. For example, using likelihood scores 155 from the speech recognizer module 130, the computing system 120 selects n candidate hypotheses 135 with the highest likelihood scores 155, where n is an integer. In some instances, the computing system 120 selects candidate hypotheses 135 with likelihood scores 155 that satisfy a likelihood score threshold. Optionally, the speech recognizer module 130 may rank the set of highest-ranking candidate hypotheses 135 using the likelihood scores 155.

In the example shown, the speech recognizer module 130 generates candidate hypotheses 135 for the utterance 101 "call Beshad on mobile" spoken by the user 10. In this example, the top two candidate transcriptions (e.g., the two that are most likely to be correct) are selected as the set of highest ranking candidate hypotheses 135. The highest ranking candidate hypotheses 135 include a first candidate hypothesis 135 "call best shot on mobile" with a likelihood score 155 of 0.8 and a second candidate hypotheses 135 "goal best shot immobile" with a likelihood score 155 of 0.2. Here, a higher likelihood score 155 indicates a greater confidence that the candidate hypothesis 135 is correct. Notably, neither of the highest ranking candidate hypotheses 135 include the utterance 101 actually spoken by the user 10 (e.g., "call Beshad on mobile"). Accordingly, if the computing system 120 selects either of the highest ranking candidate hypotheses 135, the transcription 175 output to the user 10 will be incorrect.

During stage (D), the computing system 120 executes a lattice augmenter 140 that determines, for each candidate hypothesis 135, whether the respective sequence of hypothesized terms includes a source phrase 126 from a corrected phrase list 125. The corrected phrase list 125 includes a list of phrase correction pairs. Each phrase correction pair in the corrected phrase list 125 includes a source phrase 126 and a corresponding target phrase 128. As such, the corrected phrase list (e.g., list of phrase correction pairs) 125 includes a plurality of source phrases 126, 126a-n and a plurality of corresponding target phrases 128, 128a-n. In particular, the source phrase 126 represents a misrecognized transcription previously generated by the speech recognizer module 130 and the target phrase 128 represents a corrected transcription for the misrecognized transcription.

Figure 4C:
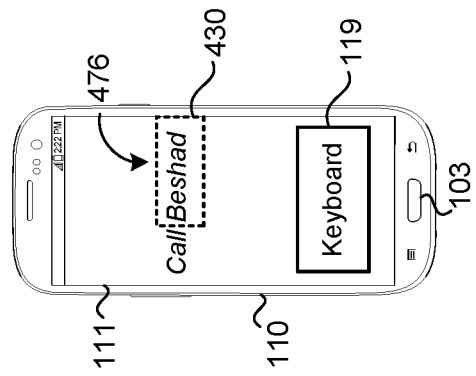
Figure 4B:
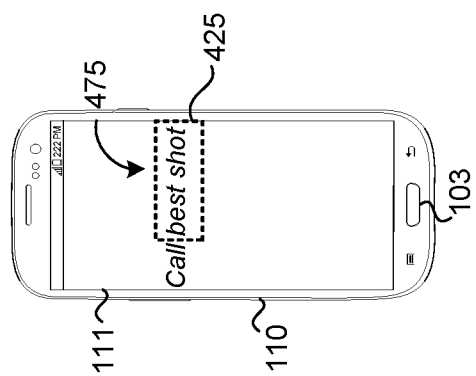

FIGS. 4A-4C illustrate correcting a misrecognized transcription and storing a corrected transcription to generate the corrected phrase list 125 (FIG. 1). In some implementations, the speech recognizer module 130 generates a misrecognized transcription 475 that misrecognizes a previous utterance 401 spoken by the user 10. As used herein, the previous utterance 401 and the misrecognized transcription 475 are received at the client device 110 at a prior time to receiving the transcription 175 and the utterance 101 (FIG. 1). As will become apparent, the misrecognized transcription 475 and the previous utterance 401 can be used to generate the corrected phrase list 125 (FIG. 1) and improve speech recognition accuracy when the client device 110 receives the utterance 101 (FIG. 1) at a later time.

FIG. 4A illustrates the microphone 103 of the client device 110 recording the user 10 speaking a previous utterance 401 "call Beshad on mobile." The client device 110 converts the previous utterance 401 to audio data 412 and transmits audio data 412 to the speech recognizer module 130. The speech recognizer module 130 processes the audio data 412 to generate the misrecognized transcription 475 corresponding to the audio data 412. In the example shown, the speech recognizer module 130 generates the misrecognized transcription 475 "call best shot" which is a misrecognition of the previous utterance 401 spoken by the user 10. The client device 110 displays the previous transcription 475 to the user 10 via a graphical user interface (GUI) 111.

Referring now to FIG. 4B, the user 10 may identify that the misrecognized transcription 475 displayed on the GUI 111 does not match the previous utterance 401. As such, the user 10 provides an input indication to the GUI 111 of the client device 110 that indicates a selection of the misrecognized phrase 425 in the misrecognized transcription 475. In some examples, the input indication includes the user 10 providing a touch input to the GUI 111 that selects the misrecognized phrase 425 from the misrecognized transcription 475. The misrecognized phrase 425 may include the entire misrecognized transcription 475 or a portion thereof. In the example shown, the misrecognized phrase 425 "best shot" only includes an incorrect portion of the previous transcription 475.

FIG. 4C illustrates the user 10 replacing the misrecognized phrase 425 in the misrecognized transcription 475 with a corrected phrase 430. In some examples, the user 10 inputs text to provide the corrected phrase 430 using a keyboard 119 of the client device 110. Optionally, the keyboard 119 may display responsive to the client device 110 receiving the input indication from the user 10 (FIG. 4B). In these examples, the user 10 may type in the corrected phrase (e.g., "Beshad") using the keyboard 118 of the client device 110. In other examples, the user 10 inputs the corrected phrase 430 by speaking to the client device 110. That is, the user 10 may speak each letter of the corrected phrase 430 (e.g., "B-E-S-H-A-D"). After receiving the corrected phrase 430, the client device 110 replaces the misrecognized phrase 425 with the corrected phrase 430 to generate a corrected previous transcription 476 that represents an accurate transcription of the previous utterance 401.

Figure 3:
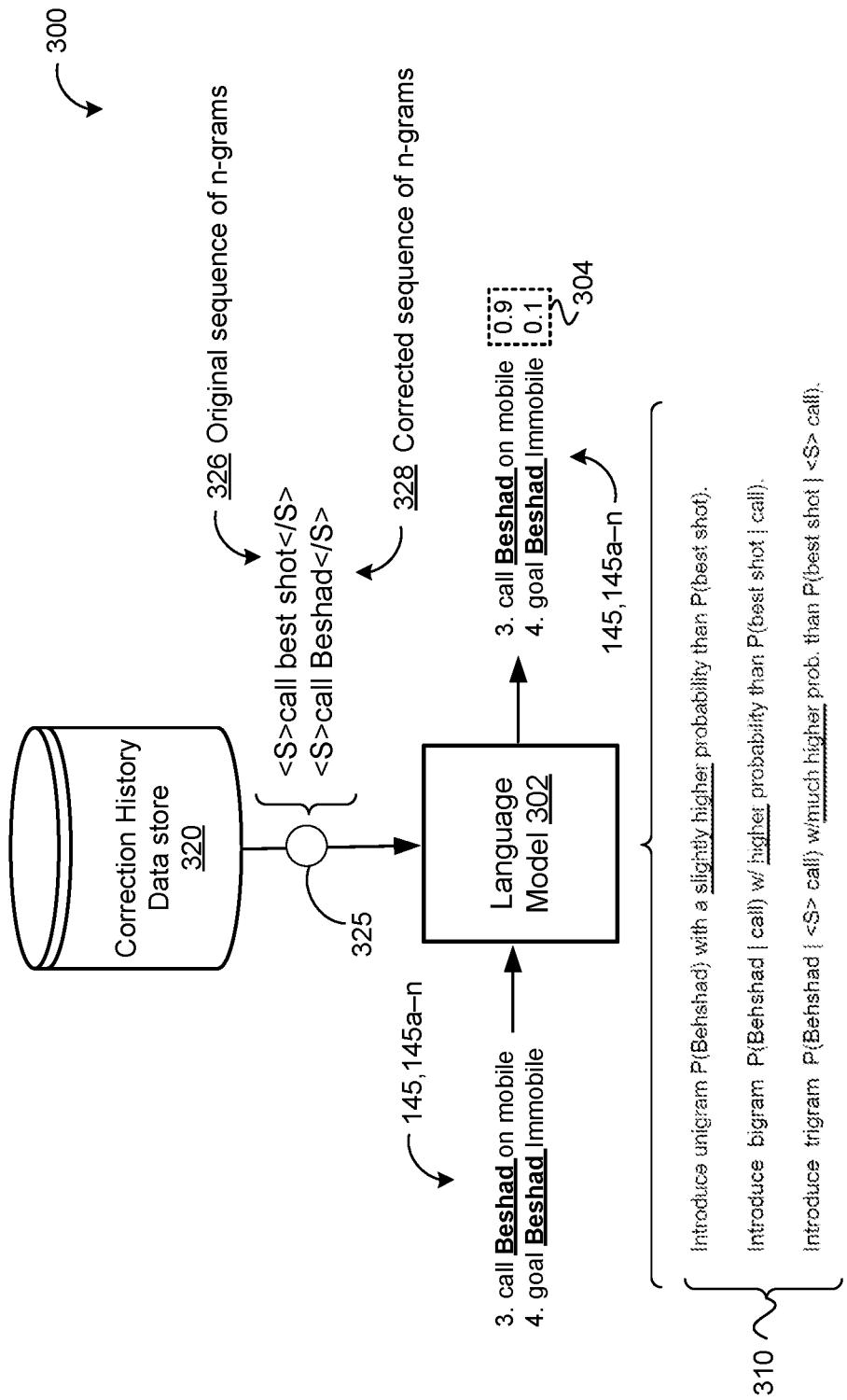
FIG. 3 is a schematic view of depicting a language model scoring candidate hypotheses.

Accordingly, the computing system 120 may store the misrecognized phrase 425 and the corrected phrase 430 as the source phrase 126 and the target phrase 128, respectively, in the corrected phrase list 125 as a phrase correction pair. In some examples, the computing system stores the misrecognized transcription 475 and the corrected previous transcription 476 as the source phrase and the target phrase 128, respectively, in the corrected phrase list 125 as a phrase correction pair. The phrase correction pairs may be stored at the memory hardware 116 of the client device 110 and/or the memory hardware 124 of the computing system 120. The phrase correction pairs may also be stored at a correction history data store 320 (FIG. 3). As will become apparent, the computing system 120 may use the phase correction pair to generate an accurate transcription 175 when the computing system 120 detects the source phrase 126 (e.g., best shot) again.

Referring back to FIG. 1, in some implementations, the lattice augmenter 140 is configured to generate additional candidate hypotheses 145, 145a-n using the candidate hypotheses 135 and the corrected phrase list 125. In particular, the lattice augmenter 140 receives the candidate hypotheses 135 and the corrected phrase list 125 to determine, for each candidate hypotheses 135, whether the respective sequence of hypothesized terms includes one of the source phrases 126 from the corrected phrase list 125. When the respective sequence of hypothesized terms includes one of the source phrases 126, the lattice augmenter 140 generates an additional candidate hypothesis 145 that replaces the source phrase 126 in the respective sequence of hypothesized terms with the corresponding target phrase 128.

Continuing with the example shown, the lattice augmenter 140 determines the first candidate hypothesis 135 "call best shot on mobile" and the second candidate hypothesis "goal best shot immobile" both include the source phrase "best shot" from the corrected phrase list 125. As such, the lattice augmenter 140 generates a first additional candidate hypothesis 145 "call Beshad on mobile" and a second additional candidate hypothesis 145 "goal Beshad immobile." Here, the lattice augmenter 140 replaces the source phrase 126 "best shot" with the target phrase 128 "Beshad" in each of the additional candidate hypotheses 145.

In some implementations, the computing system 120 executes an additional hypothesis scorer 300 (also referred to as simply "hypothesis scorer 300") configured to determine a likelihood score 155 for each additional candidate hypothesis 145 generated by the lattice augmenter 140. That is, simply generating additional candidate hypotheses 145 does not mean that the additional candidate hypotheses 145 include a correct transcription 175 of the utterance 101. For example, the lattice augmenter 140 may generate an additional candidate hypothesis 145 "What is Hungary's Beshad at the Euro cup" from a candidate hypothesis 135 of "What is Hungary's best shot at the Euro cup" (e.g., replacing source phrase 126 "best shot" with target phrase "Beshad"). In this example, the additional candidate hypothesis 145 is most likely a nonsensical hypothesis and should include a lower likelihood score 155 than the candidate hypothesis 135. As such, the computing system 120 selects the hypothesis with the highest likelihood from the candidate hypotheses 135 and the additional candidate hypotheses 145 to maximize a probability of an accurate transcription 175.

In some instances, however, the hypothesis scorer 300 may be unable to generate an accurate likelihood score 155 for the additional candidate hypotheses 145. That is, because the computing system 120 receives the additional candidate hypotheses 145 from user input, the additional candidate hypothesis 145 may be out out-of-domain, out-of-vocabulary (OOV), and/or only include sparse training data at the computing system 120. Accordingly, the hypothesis scorer 300 needs to generate likelihood scores 155 that accurately reflect the probability of whether the additional candidate hypotheses 145 are correct.

The hypothesis scorer 300 includes at least one of an acoustic model 301 and/or a language model 302. In some examples, language model 302 includes an auxiliary language model external to the speech recognizer module 130. In other examples, the language model 302 includes an internal language model integrated with the speech recognizer module130. The acoustic model 301 is configured to process the audio data 112 to determine an acoustic modeling score for a portion of the audio data 112 that includes either the source phrase 126 or the target phrase 128. In some examples, the acoustic model 301 compares an acoustic similarity of the portion of the audio data 112 that includes the source phrase 126 to the portion of the candidate hypothesis 135 that includes the source phrase 126. In other examples, the acoustic model compares an acoustic similarity of the portion of the audio data 112 that includes the target phrase 128 to the portion of the additional candidate hypothesis 145 that includes the target phrase 128.

Thus, the acoustic modeling score may indicate whether the portion of the audio data 112 that includes the source phrase 126 or the target phrase 128 is acoustically similar to the candidate hypothesis 135 or the additional candidate hypothesis 145. In some examples, the hypothesis scorer 300 cannot determine an acoustic modeling score for the additional candidate hypothesis 145. For example, when the target phrase 128 of the additional candidate hypothesis 145 is an OOV phrase, the hypothesis scorer 300 is unable to compare the portion of the audio data 112 to the OOV phrase. In these examples, the hypothesis scorer 300 assumes the source phrase 126 and the target phrase 128 are acoustically similar and rely on the language model 302 only.

In some implementations, the language model 302 of the hypothesis scorer 300 is configured to receive each additional candidate hypothesis 145 as input and determine a corresponding prior likelihood score 304 for each additional candidate hypothesis 145. The prior likelihood score 304 may indicate a probability of the additional candidate hypothesis 145 based on probability data that indicates how frequently different sequences of terms occur are received by the language model 302 120. For example, the language model 302 may assign a higher prior likelihood score 304 to an additional candidate hypothesis "three blind mice" than "tree blind mice" because the former language sequence occurs more frequently in a corpus of utterances 101 than does the latter.

In some implementations, the target phrase 128 is an OOV phrase for the language model 301. As such, for each phrase correction pair in the corrected phrase list 125, the language model 302 identifies n-grams in the language model 302 that include the corresponding source phrase 126. Here, the language model 302 clones corresponding new n-grams that substitute the target phrase 128 for the corresponding source phrase 126 in the identified n-grams. That is, the language model 302 creates a new n-gram for the target phrase 128 using the existing n-grams in the language model 302. In these implementations, the computing system 120 modifies the language model 302 by adding the new n-grams for the target phrase 128 to the language model 302 and conditioning the language model 302 to determine a higher prior likelihood score for a n-gram of the target phrase 128 than for an n-gram of the source phrase 126.

For example, the computing system 120 adds the n-gram for the target phrase 128 "Beshad" to the language model 302 that includes a slightly higher probability than the already existing n-gram for the source phrase "best shot." The n-gram for the target phrase 128 includes a slightly higher probability because of the user input indication to replace the source phrase 126 with the target phrase 128. In some instances, however, the language model 302 is unable to determine whether intent of the user 10 was to speak "Beshad" or "best shot" by simply analyzing the source phrase 126 and the target phrase 128 alone. For example, "Beshad" may be either a standalone name or a unique name (e.g., film name) such as "Call Beshad." When "Call Beshad" is a unique name, "Beshad" by itself may not have any significant meaning. Accordingly, the language model 302 may add additional context (e.g., additional n-grams) adjacent to the target phrase 128 to increase a conditional probability to predict whether user 10 intended the source phrase 126 or the target phrase 128. Simply put, if the target phrase 128 includes adjacent terms that the target phrase 128 is commonly adjacent to, the probability that the user 10 intended the target phrase 128 is greater than the source phrase 126.

Referring now to FIG. 3, in some examples, the language model 302 includes an n-gram language model that uses conditional probabilities to successively predict terms in a sequence of n-grams based on n or n−1 preceding terms and/or n or n+1 subsequent terms from the target phrase 128. In the example shown, the language model includes increased conditional probabilities 310 where the probability of the user 10 intending to convey the target phrase 128 increases as the number of n-grams increases. For example, a sequence with one n-gram is a unigram (e.g., one word), a sequence with two n-grams is a bigram (e.g., two words), and a sequence with three n-grams is a trigram (e.g., three words).

In the example shown, the increased conditional probabilities 310 includes a prior likelihood score 304 of a unigram with the target phrase 128 (e.g., "Beshad") that has a slightly higher probability than a prior likelihood score 304 of a unigram with the source phrase 126 (e.g., "best shot"). The probability is only slightly higher because the language model 302 does not know the context (e.g., other words) around the target phrase 128 and the source phrase 126.

The increased conditional probabilities 310 also includes a prior likelihood score 304 of a bigram with the target phrase 128 (e.g., "call Beshad") that has a higher probability than a prior likelihood score 304 of a bigram with the source phrase 126 (e.g., "call best shot"). Here, the margin between the prior likelihood scores 304 of target phrase 128 and the source phrase 126 of the bigram (e.g., higher probability) is greater than the margin between the prior likelihood scores 304 of the target phrase 128 and the source phrase 126 of unigram (e.g., slightly higher probability) because of the increased number of n-grams subsequent to the target phrase 128 and the source phrase 126. The increased number of n-grams provides increased context to the language model 302 such that the language model 302 can more accurately predict whether the user 10 intended the target phrase 128 or the source phrase 126. Simply put, because words that are commonly included with the term "Beshad" are in the additional candidate hypothesis 145, there is a greater likelihood that the user 10 intended to convey "Beshad" rather than "best shot."

Moreover, the increased conditional probabilities 310 also includes a prior likelihood score 304 of a trigram with the target phrase 128 (e.g., "<S> Call Beshad") that has a much higher probability than a prior likelihood score 304 of a trigram with the source phrase 126 (e.g., "<S> Call Beshad"). In this example, <S> denotes a beginning of a sentence to provide additional context. Here, the margin between the prior likelihood scores 304 of target phrase 128 and the source phrase 126 of the trigram (e.g., much higher probability) is greater than the margin between the prior likelihood scores 304 of the target phrase 128 and the source phrase 126 of the bigram and the unigram because of the increased number of n-grams subsequent to the target phrase 128 and the source phrase 126. That is, the trigram provides even more context to the language model 302 such that the language model 302 can more accurately predict the probability of the user 10 intending to convey the target phrase 128 or the source phrase 126.

As shown in FIG. 3, in some implementations, the language model 302 uses an original sequence of n-grams 326 and a corrected sequence of n-grams 328 in addition to the new n-grams. That is, for each phrase correction pair in the corrected phrase list 125, the language model 302 may obtain a sequence of n-grams 325 from a correction history data store 320. The correction history data store 320 stores the previous transcriptions 475 and corrected previous transcriptions 476 as described in FIG. 4. The sequence of n-grams 325 includes an original sequence of n-grams 326 that represents the corresponding previous transcription 475 (FIG. 4) that misrecognized the corresponding source phrase 126 and a corrected sequence of n-grams 328 (e.g., corrected previous transcription 476 (FIG. 4)) that replaces the source phrase 126 in the original sequence of n-grams 326 with the corresponding target phrase 128. Here, the original sequence of n-grams 326 includes the source phrase 126 and one or more other terms that precede and/or are subsequent to the source phrase 126 in the previous transcription 475 (FIG. 4). The corrected sequence of n-grams includes the target phrase 128 and the same one or more other terms that precede and/or are subsequent to the corresponding source phrase 126 in the previous transcription 475 (FIG. 4).

In the example shown, the original sequence of n-grams 326 includes "<S> call best shot</S>" and the corrected sequence of n-grams 328 includes "<S> call Beshad</S>." Here, both sequences of n-grams include the term "call" that precedes the source phrase 126 or the target phrase 128. In this example the original and corrected sequences of n-grams 326, 328 further include n-grams representing sentence boundaries of the previous transcription 475 transcribed by the speech recognizer module 130 for the previous utterance 401 spoken by the user 10. Namely, <S> represents a boundary token for the beginning of a sentence and </S> represents a boundary token the end of a sentence.

The computing system 120 modifies the language model 302 by adding the original sequence of n-grams 326 and the corrected sequence of n-grams 328 to the language model 302 and conditioning the language model 302 to determine a higher prior likelihood 304 for a number of n-grams from the corrected sequence of n-grams 328 than for a same number of n-grams from the original sequence of n-grams 326. That is, if the original sequence of n-grams 326 and the corrected sequence of n-grams 328 are both bigrams, the computing system 120 conditions the language model 302 to determine a higher prior likelihood score 304 for the corrected sequence of n-grams 328. For example, the language model 320 determines a higher likelihood score 155 for an corrected sequence of n-grams 328 "call Beshad" than for an original sequence of n-grams 326 "call best shot."

In some examples, the computing system 120 conditions the language model 302 to determine a lower prior likelihood score 304 for a first number of n-grams from the sequence of n-grams that includes the target phrase 128 than for a greater second number of n-grams from the sequence of n-grams that includes the target phrase 128. For example, "call Beshad on mobile" should include a higher prior likelihood score 304 because it has a greater number of n-grams than "call Beshad." These additional n-grams adjacent to the target phrase 128 provide greater confidence that the target phrase 128 is the correct transcription. That is, because the target phrase 128 is likely seen with these other words or phrases, it is likely that in this context the correct transcription includes the target phrase 128.

In some implementations, if the language model 302 receives a candidate hypothesis 135 "What is Hungary's best shot at the Euro cup" the language model 302 will determine a high prior likelihood score 304 because the candidate hypothesis 135 includes a sequence of common n-grams. However, the language model 302 may also receive an additional candidate hypothesis 145 that replaces the source phrase 126 with the target phrase 128 to generate "What is Hungary's Beshad at the Euro cup." In this example, the language model 302 determines that this sequence of n-grams has not been spoken by the user 10 before. Accordingly, the language model 302 reduces the number of n-grams leading to "Beshad" and determines the probability of that reduced sequence of n-grams.

For example, the language model 302 determines that the sequence of n-grams "What is Hungary's Beshad" has also not been spoken by the user 10 before or is spoken extremely sparsely, and thus, the language model 302 removes another n-gram. Here, the language model 302 determines that the reduced sequence of n-grams "Hungary's Beshad" has also not been spoken by the user 10 before or is spoken extremely sparsely, and thus, the language model 302 removes yet another n-gram. Continuing with the example, the language model 302 determines that the target phrase 128 "Beshad" is a new unigram that the user 10 added because of a misrecognized transcription. Accordingly, even though the prior likelihood score 304 of the unigram "Beshad" has a slightly higher probability than the prior likelihood score 304 of the unigram "best shot," the sequence of n-gram word history of "best shot" in this scenario likely means that "What is Hungary's best shot at the Euro cup" is the most likely transcription.

Referring back to FIG. 1, the corresponding likelihood score 155 determined for each additional candidate hypothesis 145 is based on at least one of the acoustic modeling score and/or the corresponding prior likelihood score 304 determined for the additional candidate hypothesis 145. During stage (F), a re-ranker 160 receives the likelihood scores 155 for the multiple candidate hypotheses 135 from the speech recognizer module 130 and the likelihood scores 155 for the additional candidate hypotheses 145 from the hypothesis scorer 300. The re-ranker 160 is configured to output a re-ranked result 165 that includes rankings for the multiple candidate hypotheses 135 and the additional candidate hypotheses 145 based on the likelihood scores. In the example shown, the re-ranked result 165 includes the additional hypotheses candidate 145 with a likelihood score 155 of 0.9 as the most likely correct transcription 175.

At stage (G), the computing system 120 is configured to generate a transcription 175 of the utterance 101 spoken by the user 10 by selecting the highest ranking candidate in the re-ranked result 165. As such, the computing system 120 determines whether a candidate hypothesis 135 that includes the source phrase 126 or a additional candidate hypothesis 145 that includes the target phrase 128 has the highest likelihood score 155. In the example shown, the computing system 120 selects the additional candidate hypothesis 145 "call Beshad on mobile" because it has the highest likelihood score 155 of 0.9. The computing system 120 may transmit the transcription 175, via the network 118, to the client device 110 to provide the transcription 175 to the user 10.

Figure 5:
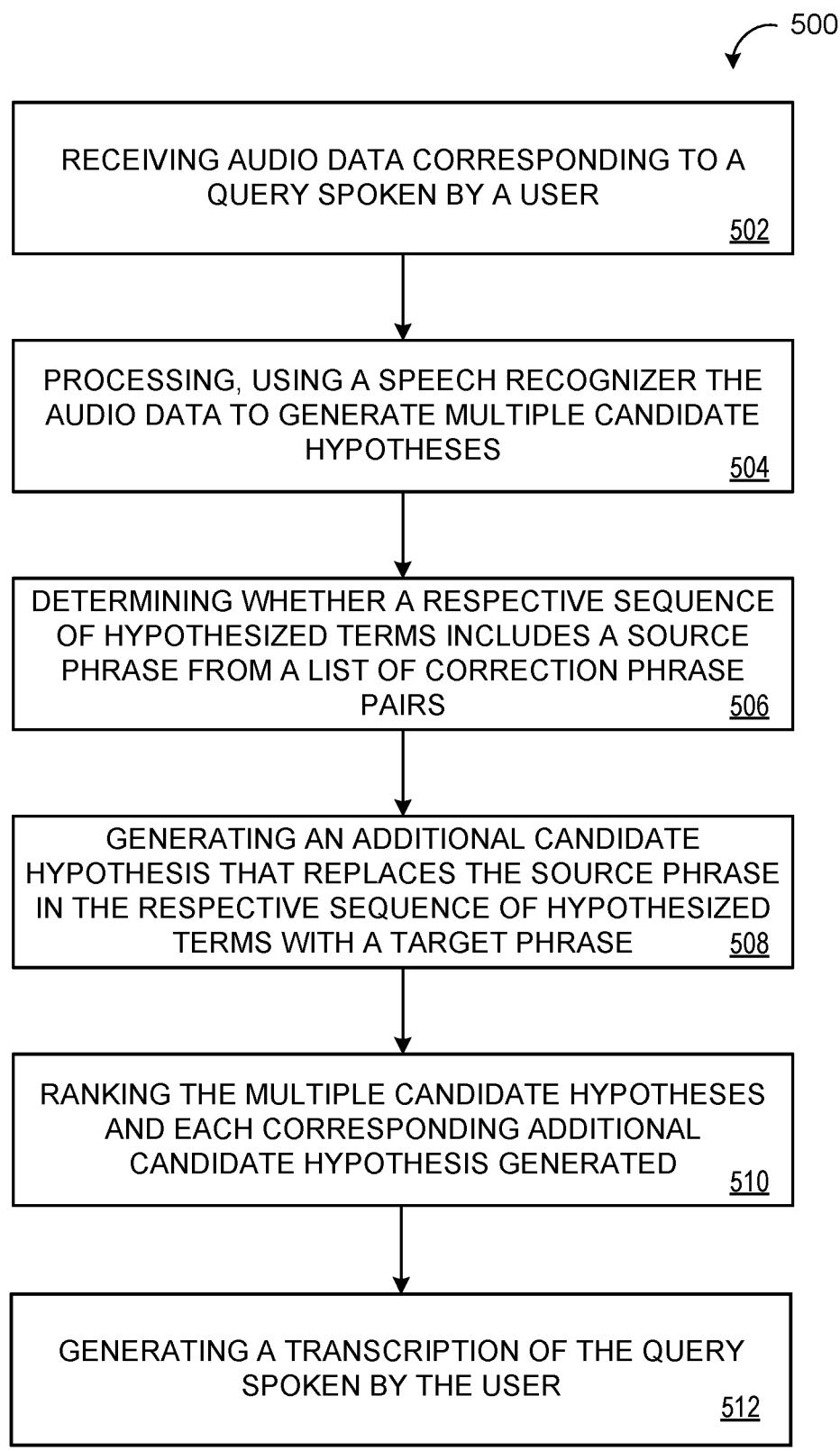
FIG. 5 is a flowchart of an exemplary arrangement of operations for a method of lattice speech corrections.

FIG. 5 is a flowchart of an exemplary arrangement of operations for a method 500 of performing lattice speech corrections. The data processing hardware 114 (FIG. 1) of the client device 110 and/or the data processing hardware 122 (FIG. 1) of the computing system 120 may execute the operations for the method 500 by executing instructions stored on the memory hardware 116, 124. At operation 502, the method 500 includes receiving audio data 112 corresponding to a query (i.e., utterance) 101 spoken by a user 10. At operation 504, the method 500 includes processing the audio data 112 using a speech recognizer module130 to generate multiple candidate hypotheses 135. Each candidate hypothesis 135 corresponds to a candidate transcription for the query 101 and is represented by a respective sequence of hypothesized terms.

For each candidate hypothesis 135, the method 500 performs operations 506 and 508. At operation 506, the method 500 includes determining whether the respective sequence of hypothesized terms includes a source phrase 126 from a list of phrase correction pairs (i.e., corrected phrase list) 125. Each phrase correction pair in the list of phrase correction pairs 125 includes a corresponding source phrase 126 that was misrecognized in a corresponding previous transcription 475 transcribed by the speech recognizer module 130 for a previous utterance 401 spoken by the user 10. Here, each phrase correction pair in the list of phrase correction pairs 125 also includes a corresponding target phrase 128 that corresponds to a user correction replacing the source phrase 126 misrecognized in the corresponding previous transcription 475 transcribed by the speech recognizer module 130. At operation 508, when the respective sequence of hypothesized terms includes the sources phrase 126, the method 500 includes generating a corresponding additional candidate hypothesis 145 that replaces the sources phrase 126 in the respective sequence of hypothesized terms with the corresponding target phrase 128.

At operation 510, the method 500 includes ranking the multiple candidate hypotheses 135 and each corresponding additional candidate hypothesis 145. At operation 512, the method 500 includes generating a transcription 175 of the query 101 spoken by the user 10 by selecting the highest ranking one of the multiple candidate hypotheses 135 and each corresponding additional candidate hypothesis 145.

Figure 6:
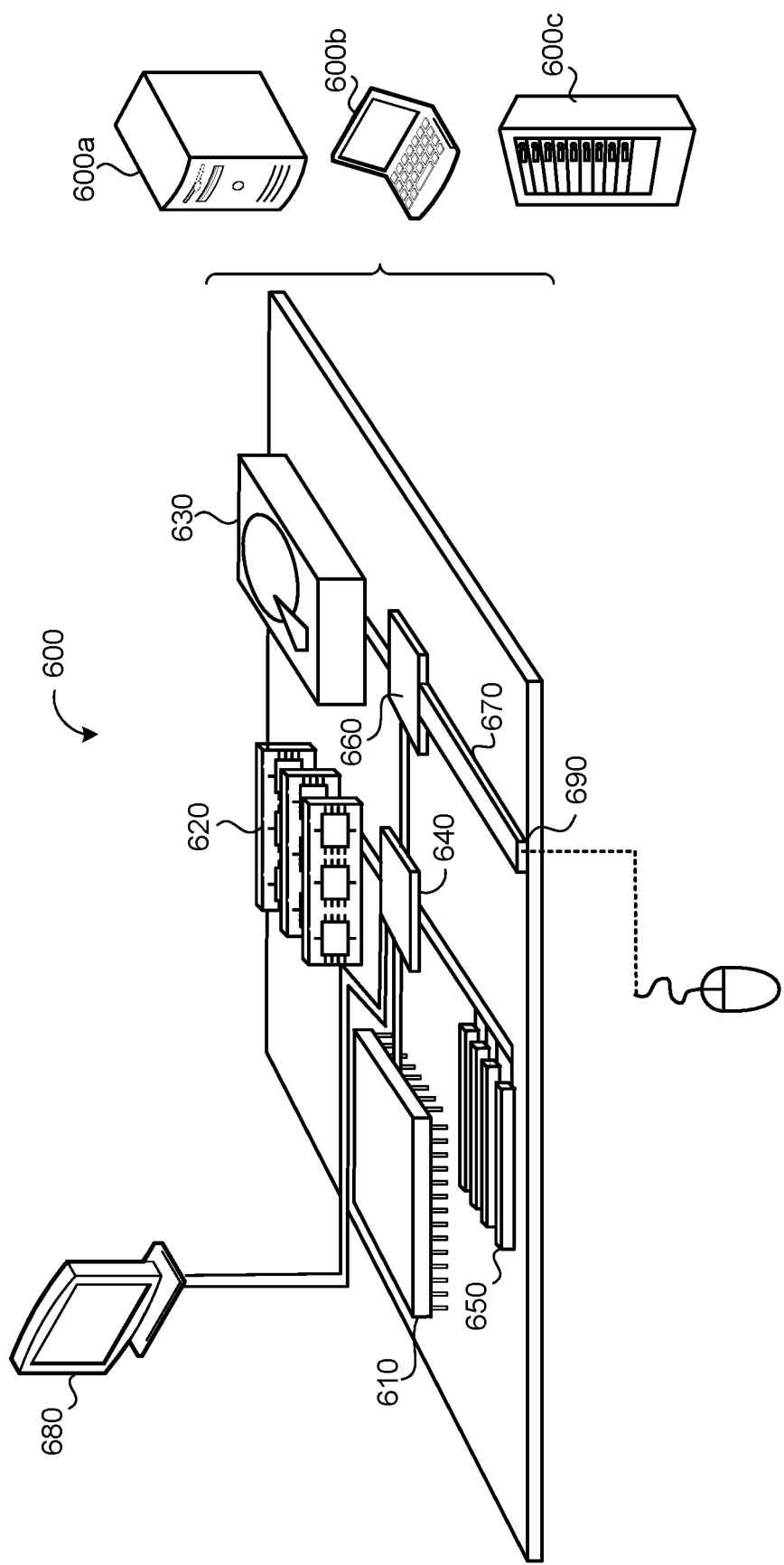
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving audio data corresponding to a query spoken by a user;
   processing, using a speech recognizer, the audio data to generate multiple candidate hypotheses, each candidate hypothesis corresponding to a candidate transcription for the query and represented by a respective sequence of hypothesized terms;
   for each candidate hypothesis:
      determining whether the respective sequence of hypothesized terms includes a source phrase from a list of phrase correction pairs, each phrase correction pair in the list of phrase correction pairs comprising:
         a corresponding source phrase that was misrecognized in a corresponding previous transcription transcribed by the speech recognizer for a previous utterance spoken by the user; and
         a corresponding target phrase that corresponds to a user correction replacing the source phrase misrecognized in the corresponding previous transcription transcribed by the speech recognizer; and
      when the respective sequence of hypothesized terms includes the source phrase, generating a corresponding additional candidate hypothesis that replaces the source phrase in the respective sequence of hypothesized terms with the corresponding target phrase;
   ranking the multiple candidate hypotheses and each corresponding additional candidate hypothesis generated;
   generating a transcription of the query spoken by the user by selecting the highest ranking one of the multiple candidate hypotheses and each corresponding additional candidate hypothesis generated; and
   for each phrase correction pair in the list of phrase correction pairs:
      obtaining an original sequence of n-grams representing the corresponding previous transcription that misrecognized the corresponding source phrase, the original sequence of n-grams including the corresponding source phrase and one or more other terms that precede and/or are subsequent to the corresponding source phrase in the corresponding previous transcription;
      obtaining a corrected sequence of n-grams that replaces the source phrase in the original sequence of n-grams with the corresponding target phrase, the corrected sequence of n-grams including the target phrase and the same one or more other terms that precede and/or are subsequent to the corresponding source phrase in the corresponding previous transcription;
      modifying a language model by:
         adding the original sequence of n-grams and the corrected sequence of n-grams to the language model; and
         conditioning the language model to determine a higher prior likelihood score for a number of n-grams from the corrected sequence of n-grams that includes the target phrase than for a same number of n-grams from the original sequence of n-grams that includes the source phrase; and
      determining, using the modified language model configured to receive each additional candidate hypothesis as input, a corresponding prior likelihood score for each additional candidate hypothesis,
      wherein ranking the multiple candidate hypotheses and each additional candidate hypothesis is based on the corresponding prior likelihood score determined for each additional candidate hypothesis.

2. The computer-implemented method of claim 1, wherein a margin between the prior likelihood scores determined by the language model for the number of n-grams from the corrected sequence of n-grams and the same number of n-grams from the original sequence of n-grams increases as the number of n-grams from the corrected and original sequences of n-grams increases.

3. The computer-implemented method of claim 1, wherein conditioning the language model further comprises conditioning the language model to determine a lower prior likelihood score for a first number of n-grams from the sequence of n-grams that includes the target phrase than for a greater second number of n-grams from the sequence of n-grams that includes the target phrase.

4. The computer-implemented method of claim 1, wherein the original and corrected sequences of n-grams each further includes n-grams representing sentence boundaries of the corresponding previous transcription transcribed by the speech recognizer for the previous utterance spoken by the user.

5. The computer-implemented method of claim 1, wherein the operations further comprise:
   for each of the multiple candidate hypotheses generated by the speech recognizer, obtaining a corresponding likelihood score that the speech recognizer assigned to the corresponding candidate hypothesis; and
   after generating each additional candidate hypothesis, determining, using an additional hypothesis scorer, a corresponding likelihood score for each additional candidate hypothesis generated,
   wherein ranking the multiple candidate hypotheses and each corresponding additional candidate hypothesis generated is based on the corresponding likelihood scores assigned to the multiple candidate hypothesis by the speech recognizer and the corresponding likelihood score determined for each additional candidate hypothesis using the additional hypothesis scorer.

6. The computer-implemented method of claim 5, wherein:
   the additional hypothesis scorer comprises at least one of:
      an acoustic model configured to process audio data to determine an acoustic modeling score for a portion of the audio data that includes either the source phrase or the target phrase; or
      the language model configured to receive each additional candidate hypothesis as input and determine the corresponding prior likelihood score for each additional candidate hypothesis; and the corresponding likelihood score determined for each additional candidate hypothesis is based on at least one of the acoustic modeling score or the corresponding prior likelihood score determined for the additional candidate hypothesis.

7. The computer-implemented method of claim 6, wherein the language model comprises an auxiliary language model external to the speech recognizer or an internal language model integrated with the speech recognizer.

8. The computer-implemented method of claim 6, wherein the speech recognizer comprises an end-to-end speech recognition model configured to generate the corresponding likelihood score for each of the multiple candidate hypotheses.

9. The computer-implemented method of claim 5, wherein:

the speech recognizer comprises an acoustic model and the language model; and the corresponding likelihood score that the speech recognizer assigned to each of the multiple candidate hypotheses is based on at least one of an acoustic modeling score output by the acoustic model or the corresponding prior likelihood score output by the language model.

10. A system comprising:

data processing hardware; and memory hardware in communication with the data processing hardware and storing instructions that when executed on the data processing hardware cause the data processing hardware to perform operations comprising:

receiving audio data corresponding to a query spoken by a user;

processing, using a speech recognizer, the audio data to generate multiple candidate hypotheses, each candidate hypothesis corresponding to a candidate transcription for the query and represented by a respective sequence of hypothesized terms;

for each candidate hypothesis:

determining whether the respective sequence of hypothesized terms includes a source phrase from a list of phrase correction pairs, each phrase correction pair in the list of phrase correction pairs comprising:

a corresponding source phrase that was misrecognized in a corresponding previous transcription transcribed by the speech recognizer for a previous utterance spoken by the user; and a corresponding target phrase that corresponds to a user correction replacing the source phrase misrecognized in the corresponding previous transcription transcribed by the speech recognizer; and when the respective sequence of hypothesized terms includes the source phrase, generating a corresponding additional candidate hypothesis that replaces the source phrase in the respective sequence of hypothesized terms with the corresponding target phrase;

ranking the multiple candidate hypotheses and each corresponding additional candidate hypothesis generated;

generating a transcription of the query spoken by the user by selecting the highest ranking one of the multiple candidate hypotheses and each corresponding additional candidate hypothesis generated; and for each phrase correction pair in the list of phrase correction pairs:

obtaining an original sequence of n-grams representing the corresponding previous transcription that misrecognized the corresponding source phrase, the original sequence of n-grams including the corresponding source phrase and one or more other terms that precede and/or are subsequent to the corresponding source phrase in the corresponding previous transcription;

obtaining a corrected sequence of n-grams that replaces the source phrase in the original sequence of n-grams with the corresponding target phrase, the corrected sequence of n-grams including the target phrase and the same one or more other terms that precede and/or are subsequent to the corresponding source phrase in the corresponding previous transcription;

modifying a language model by:

adding the original sequence of n-grams and the corrected sequence of n-grams to the language model; and conditioning the language model to determine a higher prior likelihood score for a number of n-grams from the corrected sequence of n-grams that includes the target phrase than for a same number of n-grams from the original sequence of n-grams that includes the source phrase; and determining, using the modified language model configured to receive each additional candidate hypothesis as input, a corresponding prior likelihood score for each additional candidate hypothesis, wherein ranking the multiple candidate hypotheses and each additional candidate hypothesis is based on the corresponding prior likelihood score determined for each additional candidate hypothesis.

11. The system of claim 10, wherein a margin between the prior likelihood scores determined by the language model for the number of n-grams from the corrected sequence of n-grams and the same number of n-grams from the original sequence of n-grams increases as the number of n-grams from the corrected and original sequences of n-grams increases.

12. The system of claim 10, wherein conditioning the language model further comprises conditioning the language model to determine a lower prior likelihood score for a first number of n-grams from the sequence of n-grams that includes the target phrase than for a greater second number of n-grams from the sequence of n-grams that includes the target phrase.

13. The system of claim 10, wherein the original and corrected sequences of n-grams each further includes n-grams representing sentence boundaries of the corresponding previous transcription transcribed by the speech recognizer for the previous utterance spoken by the user.

14. The system of claim 10, wherein the operations further comprise:

for each of the multiple candidate hypotheses generated by the speech recognizer, obtaining a corresponding likelihood score that the speech recognizer assigned to the corresponding candidate hypothesis; and after generating each additional candidate hypothesis, determining, using an additional hypothesis scorer, a corresponding likelihood score for each additional candidate hypothesis generated, wherein ranking the multiple candidate hypotheses and each corresponding additional candidate hypothesis generated is based on the corresponding likelihood scores assigned to the multiple candidate hypothesis by the speech recognizer and the corresponding likelihood score determined for each additional candidate hypothesis using the additional hypothesis scorer.

15. The system of claim 14, wherein:
the additional hypothesis scorer comprises at least one of:
- an acoustic model configured to process audio data to determine an acoustic modeling score for a portion of the audio data that includes either the source phrase or the target phrase; or
- the language model configured to receive each additional candidate hypothesis as input and determine the corresponding prior likelihood score for each additional candidate hypothesis; and the corresponding likelihood score determined for each additional candidate hypothesis is based on at least one of the acoustic modeling score or the corresponding prior likelihood score determined for the additional candidate hypothesis.

16. The system of claim 15, wherein the language model comprises an auxiliary language model external to the speech recognizer or an internal language model integrated with the speech recognizer.

17. The system of claim 15, wherein the speech recognizer comprises an end-to-end speech recognition model configured to generate the corresponding likelihood score for each of the multiple candidate hypotheses.

18. The system of claim 14, wherein:
the speech recognizer comprises an acoustic model and the language model; and
the corresponding likelihood score that the speech recognizer assigned to each of the multiple candidate hypotheses is based on at least one of an acoustic modeling score output by the acoustic model or the corresponding prior likelihood score output by the language model.

* * * * *